United States Patent [19] — [11] 4,298,566

Naus et al. — [45] Nov. 3, 1981

[54] METHOD OF MOLDING ELECTRICAL CONNECTOR INSULATOR

[75] Inventors: Hubert W. Naus, Monrovia; Alfred J. Bouvier, San Juan Capistrano, both of Calif.

[73] Assignee: International Telephone and Telegraph Corporation, New York, N.Y.

[21] Appl. No.: 109,982

[22] Filed: Jan. 7, 1980

[51] Int. Cl.$^{3}$ .................................. B29C 1/14

[52] U.S. Cl. .................................. 264/317; 249/61; 264/318; 425/577; 425/DIG. 12

[58] Field of Search .................. 264/272, 318, 317; 425/DIG. 12, 577; 249/61, 62

[56] References Cited

U.S. PATENT DOCUMENTS

| | | | |
|---|---|---|---|
| 3,136,831 | 6/1964 | Zinn | 249/61 |
| 3,587,156 | 6/1971 | Sorenson | 249/61 |
| 3,608,046 | 9/1971 | Philips et al. | 249/62 |
| 4,187,272 | 2/1980 | Bourdon et al. | 264/272 |

FOREIGN PATENT DOCUMENTS

| | | | |
|---|---|---|---|
| 1492821 | of 1967 | France | 249/61 |

*Primary Examiner*—James B. Lowe
*Attorney, Agent, or Firm*—Thomas L. Peterson

[57] ABSTRACT

A one-piece, homogeneous electrical connector insulator is disclosed having an integral contact retention cone in each contact passage thereof. The insulator is made by the use of a mold having two core pins for each contact passage, and a suitably formed bushing positioned between the core pins which is removed by etching after the core pins are withdrawn from the molded insulator.

4 Claims, 6 Drawing Figures

METHOD OF MOLDING ELECTRICAL CONNECTOR INSULATOR

BACKGROUND OF THE INVENTION

The present invention relates to an electrical connector of the type in which the contacts are inserted into and extracted from the rear of the connector insulator and, more particularly, to an insulator for such a connector embodying integral contact retention cones and a method and apparatus for making the same.

It is desirable in an electrical connector to have the insulator therein in which the contacts are mounted formed of a one-piece, homogeneous dielectric material. U.S. Pat. No. 4,114,976 to Selvin et al. discloses methods for mounting metal contact retention clips in onepiece insulators. In one such method, as depicted in FIGS. 1 and 2 of the patent, the insulator is molded around a single core pin for each contact passage having an aluminum sleeve mounted over the pin. After the core pin is removed from the molded insulator, the sleeve is removed by etching with a chemical solution. Thus, there is provided in the wall of each contact passage an annular groove having shoulders at its opposite ends which positively retain a contact retention clip that is snapped into the groove through the rear of the contact passage. The core pin has a small-diameter forward end which allows a "closed entry" to be formed at the front of the passage when the insulator is molded around the pin. The closed entry provides an inwardly extending annular flange at the front of the contact passage which limits forward movement of the contact therein. In addition, if the contact is a socket contact having spring beams, the flange will prevent the beams from being damaged when a mating pin contact or electrical probe is inserted into the contact passage from the front of the insulator.

U.S. Pat. No. 3,165,369 to Maston and U.S. Pat. No. 3,727,172 to Clark disclose electrical connectors utilizing insulators having integral contact retention cones in the contact passages thereof. Each contact passage and cone therein is formed by the use of a pair of core pins in a mold having end regions which are shaped to define the contact retention cone when a dielectric material is molded around the pins. After the material hardens, the core pins are separated to provide a through passage with a contact retention cone directed toward the front of the insulator thus formed. In order to provide entry for the contact passage, a second insulator must be mounted on front of the first mentioned insulator. The second insulator is adhered to the first insulator by a suitable adhesive or cement. The resulting two-piece insulator has the disadvantage that the boundary line between the front and rear insulator parts produces a potential electrical leakage path which could cause shorting between adjacent contacts in the insulator.

It is the object of the present invention to provide a one-piece, homogeneous electrical connector insulator embodying integral contact retention cones in contact passages having closed entries, and a method and apparatus for manufacturing the same.

SUMMARY OF THE INVENTION

According to the invention, there is provided a one-piece, homogeneous electrical connector insulator embodying integral contact retention cones and closed entries by utilizing a two-part separable mold having opposed core pins mounted on the two parts separated by a bushing for each contact passage to be formed. One of the core pins is dimensioned to define the bore in the closed entry of the contact passage and the other core pin and adjacent surface of the bushing is shaped to define the cone. The mold is filled with a dielectric material which is allowed to harden to form the insulator. The mold parts are separated to remove the core pins from the thus formed insulator. Thereafter, the bushing is eliminated from the insulator, such as by etching.

DESCRIPTION OF THE PREFERRED EMBODIMENTS

Figure 1:
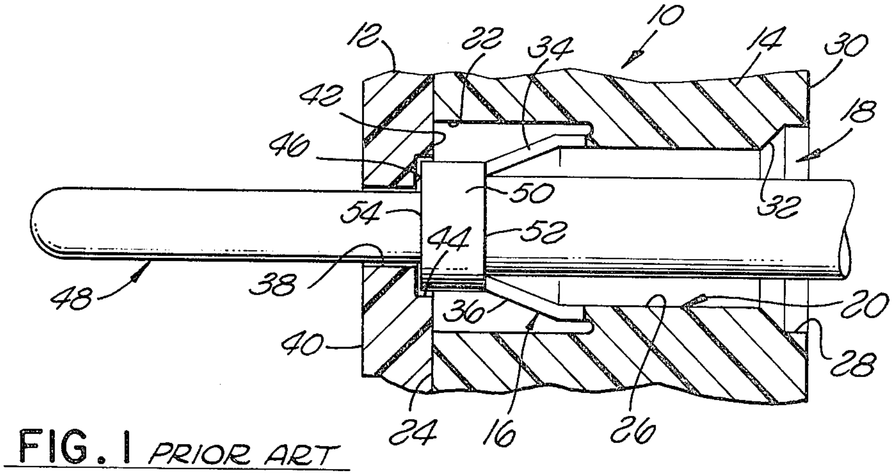
FIG. 1 PRIOR ART
FIG. 1 is a fragmentary, partial longitudinal sectional view through a prior art two-piece connector insulator having a pin contact mounted in the contact passage, with the rear insulator embodying an integral contact retention cone for retaining the contact in the passage.

Referring now to FIG. 1 of the drawings in detail, there is shown a two-piece prior art electrical connector insulator assembly, generally designated 10, comprising a front insulator 12 and a rear insulator 14. The rear insulator embodies an integral contact retention cone 16 in the contact passage 18 of the assembly. That portion of the contact passage 18 which is formed in the rear insulator 14 comprises a cylindrical bore 20 having a forward section 22 opening at the front face 24 of the insulator, a second smaller diameter section 26 behind the forward section, and a rear larger diameter section 28 opening to the rear face 30 of the insulator. The sections 26 and 28 are joined by a tapered transitional section 32. The contact retention cone 16 extends forwardly from the wall of section 26 of the bore 20. Normally, the cone 16 is longitudinally slotted, as indicated at 34, to provide a plurality of forwardly and inwardly extending resilient retention fingers 36 which are capable of being radially expanded. Typically, four such fingers are formed by the provision of four slots in the cone. As explained previously herein, the front insulator 12 is adhered to the rear insulator 18 by cement or adhesive. A bore 38 extends from the front 40 to the rear 42 of the front insulator coaxial with the bore 20. The diameter of the bore 38 is less than the diameter of the intermediate cylindrical section 26 of bore 20, thus providing a rearwardly facing annular surface in the contact passage. A cylindrical recess 44 is formed in the surface 42 coaxial with the bore 38 providing an annular abutment 46. Thus, the front insulator provides a closed entry for the contact passage.

A pin contact 48 is shown mounted in the contact passage. The pin contact has an enlargement 50 in front of the contact retention cone 16. The enlargement defines a rearwardly facing annular shoulder 52 which abuts the ends of the fingers 36, whereby rearward movement of the contact in the passage is limited. Forward movement of the contact in the passage is restricted by engagement of a forwardly facing shoulder 54 on the enlargement 50 with the annular abutment 46 on the front insulator. As well known in the art, the contact may be removed from the rear of the insulator by inserting a suitable tool into the rear of the bore 20 to deflect the resilient fingers 36 outwardly from behind the shoulder 52. The two-piece insulator assembly of the prior art results in added manufacturing and assembling costs, and the joint between the front and rear insulators thereof provides a potential electrical leakage path.

Figure 2:
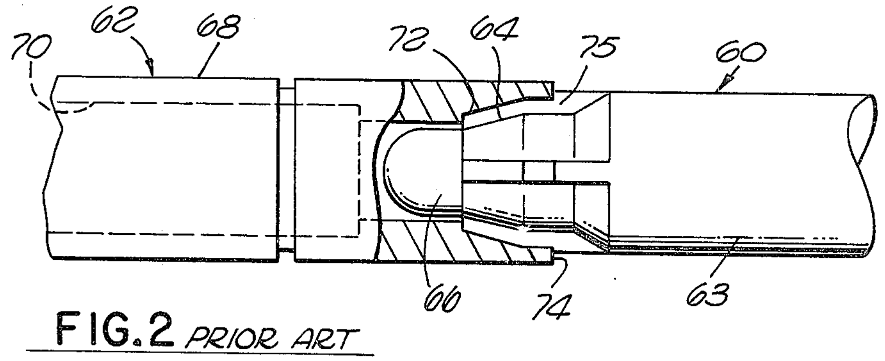
FIG. 2 PRIOR ART
FIG. 2 is a partial, longitudinal sectional view showing the core pins utilized to form the contact passage in the rear insulator of the assembly illustrated in FIG. 1 in accordance with the prior art method.
Figure 3:
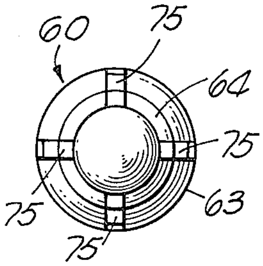
FIG. 3 PRIOR ART
FIG. 3 is a front end view of the male core pin illustrated in FIG. 2.

FIGS. 2 and 3 illustrate core pins of the type utilized for forming the contact bore 20 in the rear insulator 14 of the insulator assembly illustrated in FIG. 1. More specifically, there is provided a male core pin 60 and female core pin 62. The male core pin comprises a cylindrical rod 63 having a tapered forward end section 64 terminating in a front, small diameter guide section 66. The female core pin 62 comprises a cylindrical rod 68 having a bore 70 therethrough terminating in a tapered recess 72 opening at the front 74 of the rod. Four longitudinally and radially extending fins 75 are formed on the tapered forward section 64 of the male core pin 60. When the tapered section of the male core pin is inserted into the forward end of the female core pin, as seen in FIG. 2, a conical cavity is formed between the wall of the tapered recess 72 and the outer surface of the tapered section 64 of the male core pin. The conical cavity is divided into four sections by the fins 75. When a dielectric material is molded around the pins, the conical cavity is filled to form the contact retention cone 16 illustrated in FIG. 1. After the dielectric sets, the two parts of the mold (not shown) on which the core pins 60 and 62 are mounted, are separated thus providing the rear insulator 14 illustrated in FIG. 1.

Figure 4:
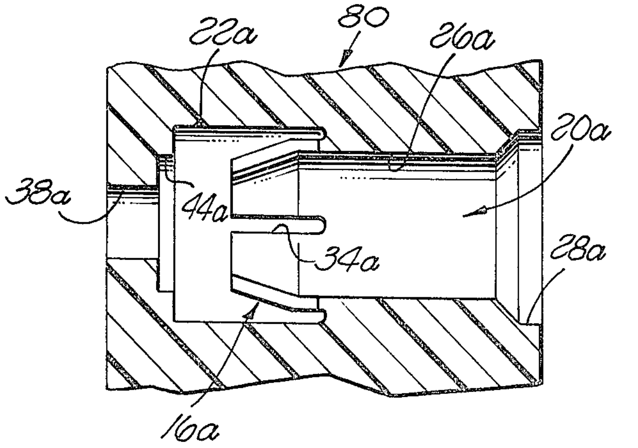
FIG. 4 is a longitudinal sectional view through the one-piece, homogeneous connector insulator of the present invention.
Figure 6:
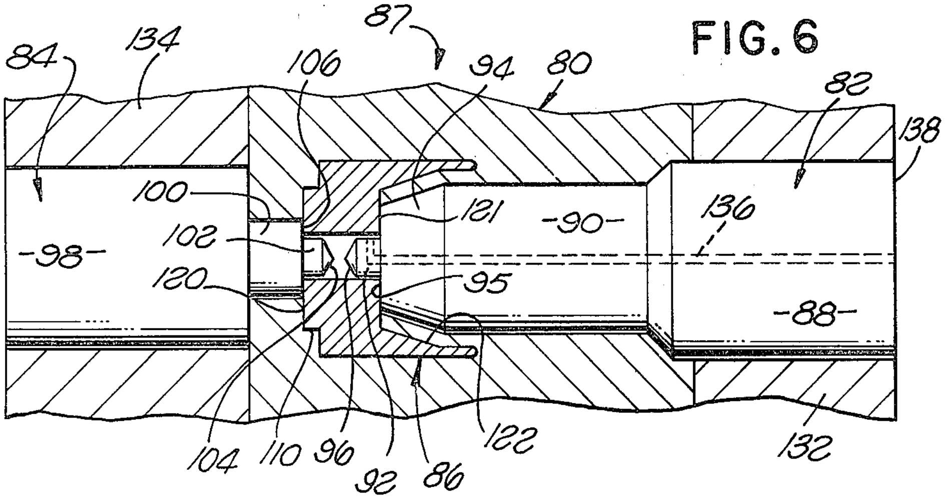
FIG. 6 is a fragmentary, partial, longitudinal sectional view through a mold for making the insulator illustrated in FIG. 4, incorporating the core pins and bushing illustrated in FIG. 5.

Reference is now made to FIGS. 4 and 6 of the drawings which illustrate the connector insulator 80 of the present invention, which is seen to consist of a one-piece, homogeneous molded part. The reference numerals utilized in FIGS. 4 and 6 relating to the insulator 80 correspond to those utilized in FIG. 1 with the suffix "a" added.

Figure 5:
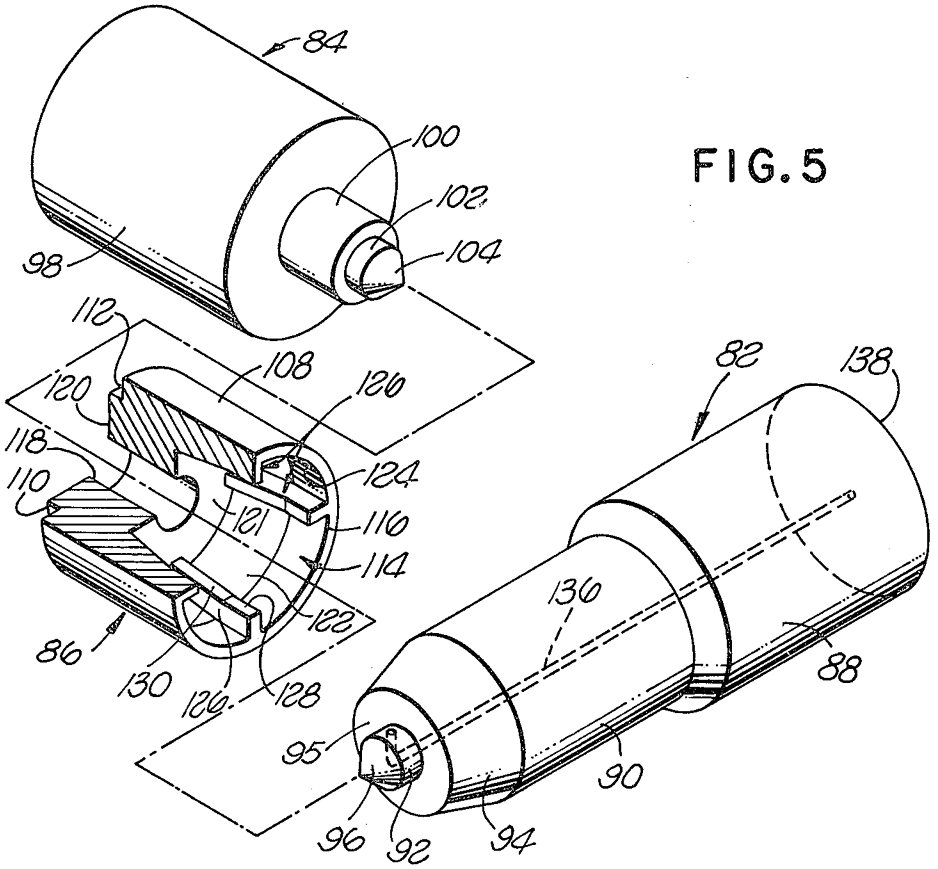
FIG. 5 is a perspective view of the core pins and bushing utilized in molding the insulator illustrated in FIG. 4, with a portion of the bushing removed to show its interior construction.

FIG. 5 illustrates two male core pins 82 and 84 and an etchable metal bushing 86 utilized to form the one-piece, homogeneous insulator 80, and FIG. 6 illustrates a two-piece, separable mold, generally designated 87, in which the core pins and bushing of FIG. 5 are positioned to produce the insulator.

The core pin 82 has a rear cylindrical section 88, a smaller diameter cylindrical section 90 in front of the rear section 88, and a still smaller diameter cylindrical section 92 joined to the section 90 by a frustro-conical section 94 and an annular shoulder 95. The pin 82 terminates at its forward end in a pointed end or guide 96.

The core pin 84 has a rear cylindrical section 98, a second smaller diameter cylindrical section 100 in front of the section 98 and a forward even smaller diameter cylindrical section 102 terminating in a pointed guide 104. A radially extending annular shoulder 106 joins the cylindrical sections 100 and 102.

The bushing 86 may be formed of aluminum, zinc or any other metal which is readily etched in a chemical solution. The bushing may be formed by die casting, cold heading or the like. The bushing comprises a cylindrical body 108 having a circular boss 110 extending outwardly from the end 112 of the body and a generally tapered recess, generally designated 114, opening at the opposite end 116 of the body. A cylindrical bore 118 extends from the flat end surface 120 of the boss 110 to an annular, radially extending shoulder 121 forming the bottom of the recess 114. The recess is also defined by a frustro-conical surface 122 and a cylindrical inner surface 124 adjacent to the end 116 of the bushing.

Four longitudinally and radially inwardly extending fins or ribs 126 are formed on the interior of the recess 114, the number corresponding to the desired number of slots in the contact retention cone of the insulator to be formed. Each fin embodies a front longitudinally extending inner surface 128, and a rear inwardly and rearwardly extending tapered surface 130 which terminates at the shoulder 121.

The diameter of the rear cylindrical section 88 of the core pin 82 corresponds to the diameter 28*a* of the bore 20*a* in the insulator 80. The diameter of the cylindrical section 90 of the pin 88 corresponds to the diameter of the cylindrical section 26*a* of the bore 20*a*. The frustro-conical section 94 of the core pin 92 is shaped to define the inner surface of the contact retention cone 16*a* of the insulator 80 while the frustro-conical surface 122 of the recess 114 in the bushing 86 is shaped to define the outer surface of the cone. The forward cylindrical section 92 of the pin 82 is dimensioned to have a sliding fit within the bore 118 in bushing 86.

The diameter of the cylindrical section 100 of the core pin 84 corresponds to the diameter of the bore 38*a* of the closed entry of the insulator 80 and the forward section 102 of the pin 84 is dimensioned to have a sliding fit into the bore 118 in bushing 86. The boss 110 on the end 112 of the bushing has a diameter corresponding to the diameter of the cylindrical recess 44*a* in the contact passage of insulator 80. The outer diameter of the cylindrical body 108 of bushing 86 corresponds to the diameter of the cylindrical section 22*a* of the contact passage through the insulator.

Referring again to FIG. 6, the rear section 88 of the core pin 82 is fixedly mounted in one part 132 of the mold 87 while the rear section 98 of the core pin 84 is fixedly mounted in the other part 134 of the mold. The core pins are coaxially aligned with each end inserted into the bushing 86 disposed between the core pins. When the mold is closed, the shoulder 106 on the core pin 84 abuts the flat surface 120 on the end of the boss 110 of bushing 86, and the shoulder 95 on the core pin 82 abuts the bottom 121 of the recess 114 in the bushing. The frustro-conical section 94 of the pin 82 engages the tapered surfaces 130 of the fins 126 and the forward portion of the cylindrical section 90 of pin 82 slidably engages the longitudinally extending inner surfaces 128 of the fins.

To form the insulator 80, a dielectric material such as plastic is injected into the mold, filling the voids therein, including the conical cavity formed between the surfaces 94 and 112 to form the contact retention cone 16. Complete filling of the mold, particularly in the area of the aforementioned conical surfaces may be facilitated by providing a vent passage 136 in the core pin 88 leading from the surface of the cylindrical section 92 to the rear 138 of the pin. Such passage allows the escape of any entrapped air and gases from the mold during the injection of plastic thereinto. After the plastic is injected into the mold and allowed to harden, the two parts 132 and 134 of the mold are separated thereby removing the core pins 82 and 84 from the thus formed insulator 80. After the plastic insulator has fully cured, the bushing 86 is removed by etching in a chemical bath. The resulting insulator construction is as shown in FIG. 4.

It will be appreciated that in practice, the mold 87 will contain a plurality of sets of core pins 82, 84 and bushings 86 to form a plurality of contact passages in the insulator. It will be further appreciated that the method and apparatus of the present invention allows the production of one-piece, homogeneous electrical connector insulators embodying integral contact retention cones in the contact passages for restricting rearward movement of contacts therein, as well as closed entries and thus rearwardly facing shoulders in front of the cones for restricting forward movement of the contacts in the cavities. Thus, the invention reduces the number of parts required for the connector insulator, reduces manufacturing and assembly costs, and eliminates a potential electrical leakage path which exists in the prior art insulators employing integral contact retention cones.

The term "one-piece, homogeneous insulator" as used in this description and the appended claims is intended to mean the hard plastic insulator in which the contacts are supported, and excludes elastomeric sealing grommets which are often mounted on the front or rear faces of the hard insulator.

Various modifications to the invention will be apparent to those skilled in the art. For example, the fins 126 could be provided on the core pin 82 rather than on the bushing 86. Also, the shape of the surfaces 94 and 122 may be modified to provide a different configuration to the contact retention cone *16a* than that shown. Also, the boss 110 on the bushing could be eliminated, if desired.

What is claimed is:

1. A method of making a one-piece, homogeneous, electrical connector insulator having a contact passage therethrough with a closed entry defined by a circumferentially continuous inwardly extending annular flange adjacent to one end of said passage and a contact retention cone adjacent to the other end of said passage, comprising the steps of:

providing a two-part separable mold having opposed core pins mounted on the two-parts separated by a separable bushing, one of said core pins being dimensioned to define the bore in said closed entry and the other core pin and adjacent surface of said bushing being shaped to define said cone;

spacing said bushing from the mold part in which said one core pin is mounted;

filling said mold with a plastic;

allowing said plastic to harden to form an insulator;

separating said parts of said mold to remove said core pins from said insulator; and eliminating said bushing from said insulator.

2. A method as set forth in claim 1 wherein:

said bushing is eliminated from said insulator by an etching process.

3. A method of making a one-piece, homogeneous electrical connector insulator having a contact passage therethrough with a closed entry defined by a circumferentially continuous inwardly extending annular flange adjacent to one end of said passage and resilient, radially expandable integral contact retention means adjacent to the other end of said passage extending forwardly and inwardly into said passage, comprising the steps of:

providing first and second core pins and a separable bushing, said bushing having a tapered recess in one end thereof for defining the outer surface of said contact retention means, said first core pin having a tapered end portion for defining the inner surface of said contact retention means, and said second core pin having a cylindrical portion of a diameter less than the outer diameter of said bushing for defining the bore in said closed entry;

inserting said first core pin coaxially into the recess in said bushing to a position wherein said tapered end portion thereof is close to but spaced from the tapered wall of said recess;

positioning said second core pin coaxially relative to said bushing with said cylindrical portion thereof adjacent to the other end of said bushing;

providing a continuous annular space immediately surrounding said cylindrical portion of said second core pin for forming said annular flange;

molding an insulator around said bushing and core pins;

removing said core pins from said insulator leaving said bushing therein; and eliminating said bushing from the interior of said insulator.

4. A method as set forth in claim 3 wherein:

said bushing is formed of metal and is eliminated by etching in a chemical solution.

* * * * *